July 6, 1926. 1,591,068
R. L. WILLIAMS
MICROPHONE MOUNTING
Filed April 25, 1918  3 Sheets-Sheet 1

July 6, 1926.

R. L. WILLIAMS 1,591,068

MICROPHONE MOUNTING

Filed April 25, 1918      3 Sheets-Sheet 2

INVENTOR=
Robert L. Williams

By
HIS ATTORNEYS=

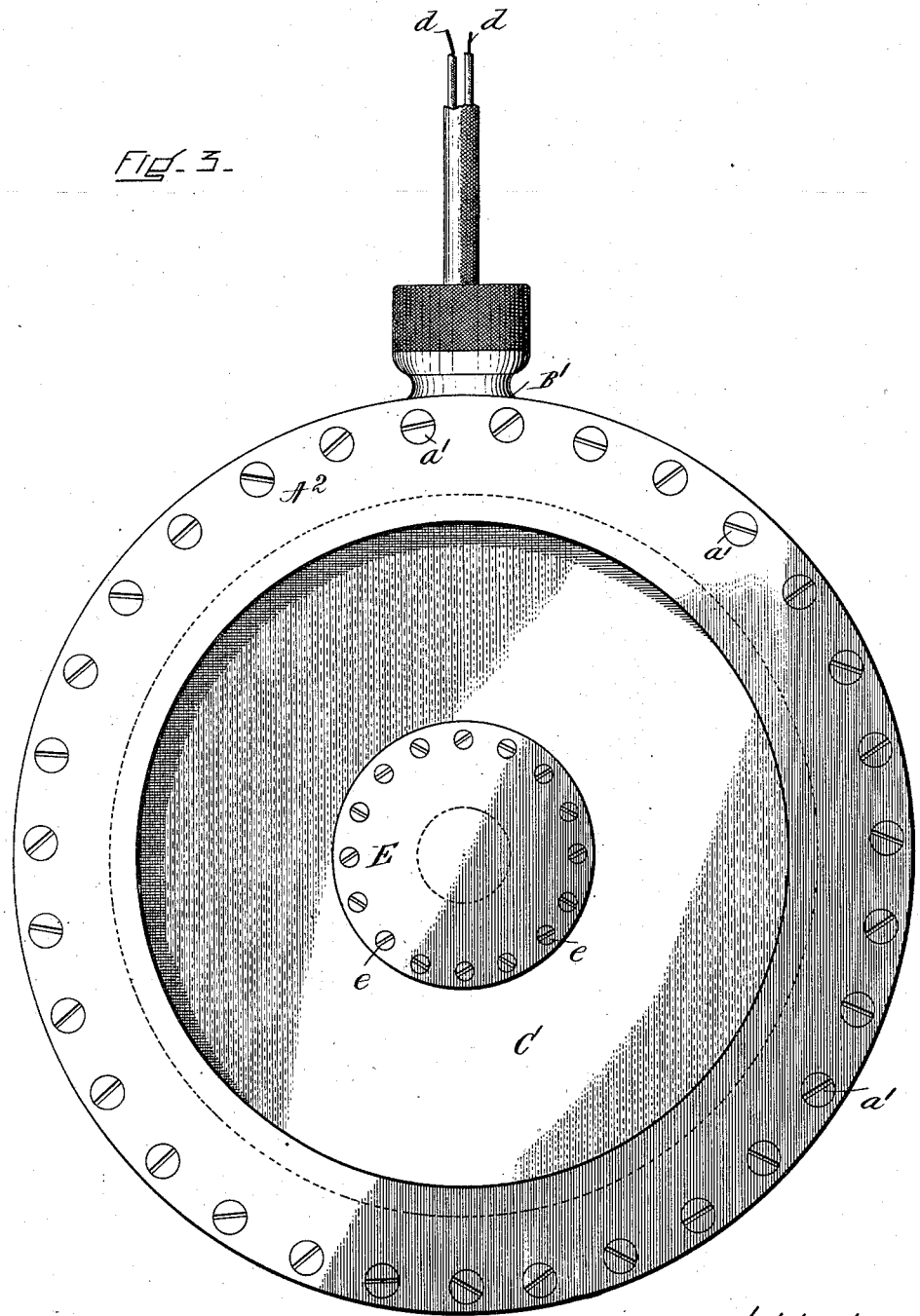

Patented July 6, 1926.

1,591,068

UNITED STATES PATENT OFFICE.

ROBERT L. WILLIAMS, OF NEWTON, MASSACHUSETTS, ASSIGNOR TO SUBMARINE SIGNAL COMPANY, OF BOSTON, MASSACHUSETTS, A CORPORATION OF MAINE.

MICROPHONE MOUNTING.

Application filed April 25, 1918. Serial No. 230,801.

The purpose of my invention is to mount a microphone in such a manner that it may respond to noises of all kinds rather than to sound waves of fixed periodicity, and hence rather than mount it on a thin sensitive diaphragm I mount it on an elastic diaphragm or disk of rubber or the like, which has no pitch of its own and is itself mounted in such a way that it is under no stress.

The microphone is thus mounted that it may be used at any water depth because the pressures on both sides of it are equal.

My invention will be understood by reference to the drawings in which it is shown in two similar forms.

Fig. 3 is an elevation of the receiving side of the apparatus shown in Fig. 2.

Figure 1:
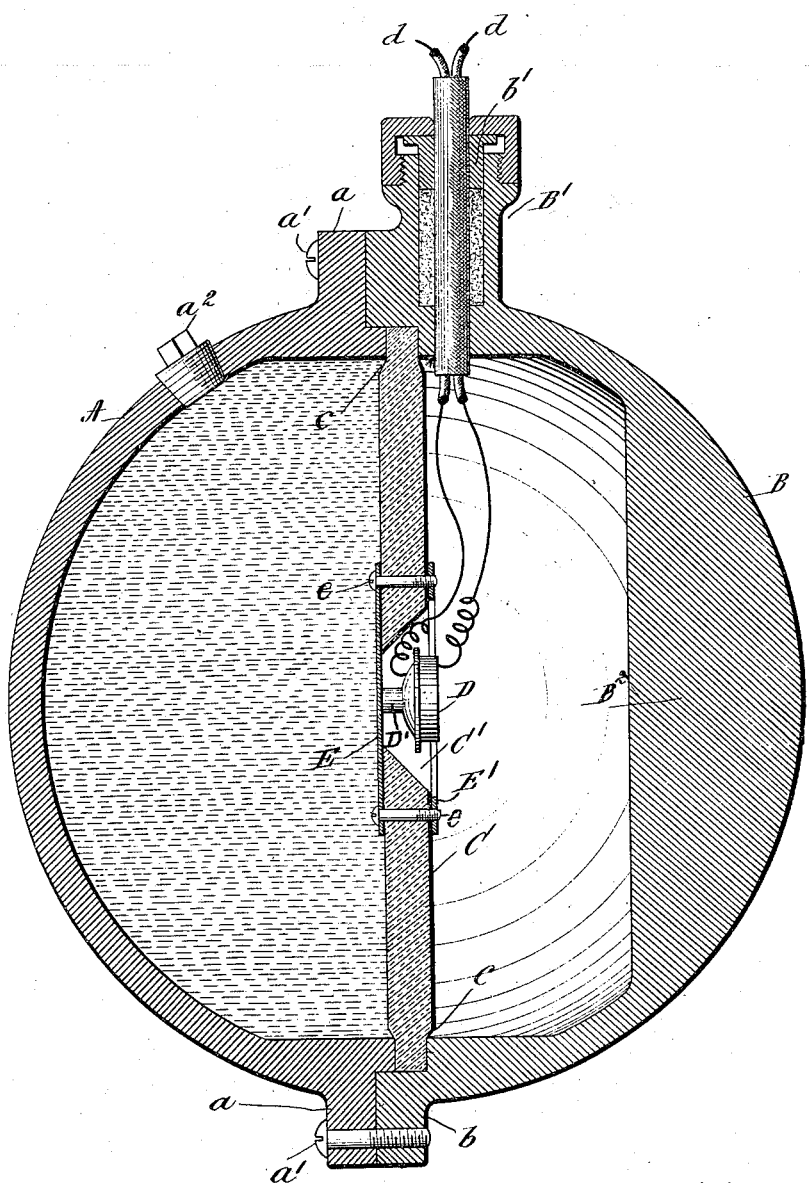
Figure 1 is a vertical section in its preferred form.

Referring first to Fig. 1, the casing comprises two parts A and B both of which have flanges $a$, $b$, so shaped that they may be bolted together by bolts $a^1$. These parts are preferably hemispherical in shape and when bolted together a circular space or groove $c$ is left in which is clamped a disk C of flexible rubber or the like of sufficient elasticity or otherwise at its edge as to be compressed at its edge between the hemispheres A and B and form a watertight joint so that the chamber formed in the hemisphere A may be filled with water which will not leak into the chamber formed in the hemisphere B.

The chamber in hemisphere A is filled with water through an opening closed by the screw plug $a^2$.

The part B is provided with a neck $B^1$ in which is a stuffing box $b^1$ through which leads $d$ pass out from the microphone so that it may be connected to the usual receiver circuit. The side of the part B opposite the disk C is preferably thickened as shown at $B^2$ to counterbalance the weight of the water in the chamber in A.

The disk C being made of rubber or other like flexible or non-periodic material, serves as a microphone mounting, has no periodic vibration and is not under stress. It has an opening $C^1$ large enough only and properly shaped to provide an attachment for the microphone D.

A convenient form of attachment is shown in the parts E, $E^1$ of which the part E is a disk and the part $E^1$ is a ring, the part E closing the opening $C^1$ on the water side of the disk C and the part $E^1$ serving as a clamping ring on the opposite side of the opening, the two being attached by screws $e$ which clamp them against the disk so as to make a watertight joint.

A member of the microphone button D is firmly attached to the part E by a stem $D^1$ or otherwise, the two members of the microphone being connected in the way well known so as to operate as an inertia button.

It is known that in receiving sound waves or compressional impulses better results are secured if the member to which a microphone is attached is in contact with a liquid of the same general character as that in which the sound waves originate and through which they pass. For this reason the part A is filled with water. Because of the strength of the casing the pressure of the outside water, owing to the depth to which the device is sunk, is immaterial in this form of my device. The difference in pressure on the two sides of the disk C, i. e., that of water and air at their natural pressures—is ineffective to cause any strain on the disk C or its attachments.

Figure 2:
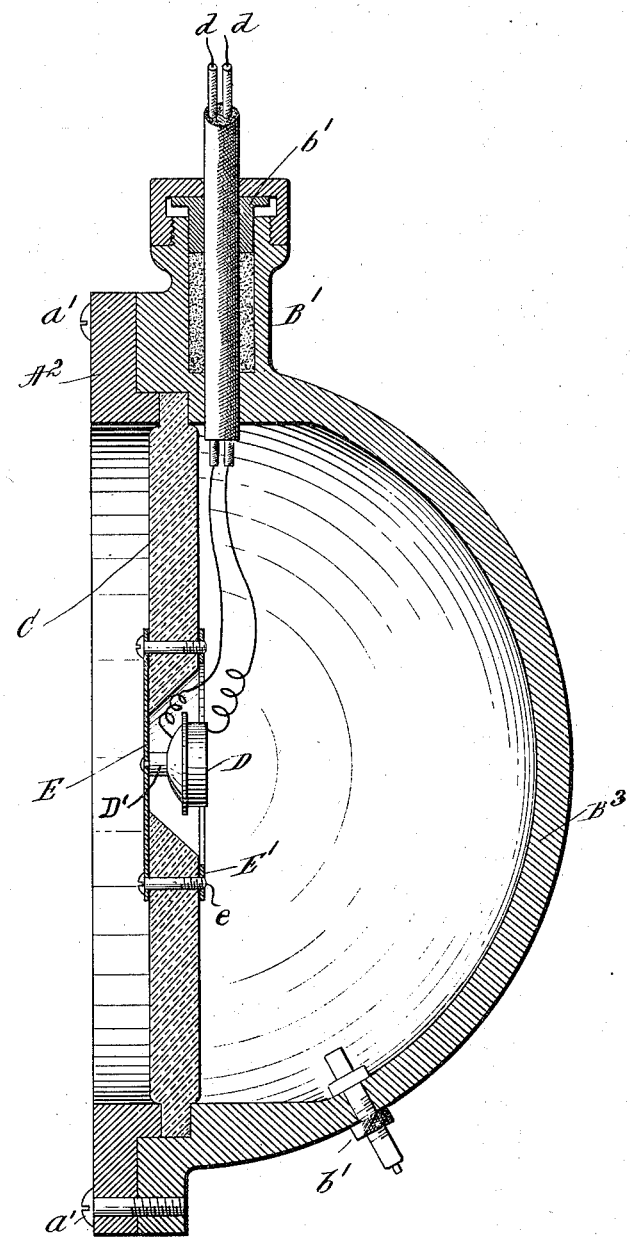
Fig. 2 is a similar section of a modification of the casing.

Another form of my invention is shown in Fig. 2 in which provision is also made for maintaining an equal pressure on both sides of the disk C irrespective of the depth to which the device is sunk. While in Fig. 1 this course is prevented by the part A, which protects the disk from the open water, in Fig. 2 it is prevented by using the chamber in the casing $B^3$ as a compressed air chamber which may be filled with air under sufficient pressure to offset the pressure on the other side of the disk C due to the depth to which the device is sunk. In this case the part A is eliminated except for the ring $A^2$ which secures the disk C in place by means of the bolts $a^1$ as before.

The part $B^3$ is identical with the part B shown in Fig. 1 except for the opening closed by the screw plug $b^1$ and the thickening $B^2$ of its wall B. When the screw plug $b^1$ is removed the chamber in the part B may be filled with air to the desired pressure and the plug $b^1$ then screwed into place. When, therefore, the device is to be hung overboard, for example, from a ship or pier, the chamber in the part B is filled with air at sufficient pressure to balance the water pressure on the other side of the disk C, at the depth to which the device is to be sunk.

Thus in both cases the microphone and its aperiodic mounting have equal pressure on both sides of them and the microphone is therefore in condition to act as occasion may require.

It will be noted that the disk C, being made of a non-resonant or sound-absorbing material, has no periodicity of vibration and hence it cannot influence the vibrations of the microphone in such a way that it will be more responsive to vibrations of one pitch than to any other.

Other methods of utilizing or embodying this invention will occur to those skilled in the art, this invention being primarily the supporting of a microphone upon an aperiodic disk or support so that it will respond promptly to noises or other aperiodic vibrations and its response, that is, the vibrations which it transmits to its receiver,—will in no wise be controlled by periodic vibrations set up in the support itself.

The casing is best made of some composition which water will not injure and, while the microphone mounting is preferably made of rubber, other material may be used for the purpose.

By the means above described a microphone is mounted in such a manner that it is responsive to what may be termed noises, and it does not respond so readily to sounds of any given or regular pitch. Thus it should be very sensitive to sounds of approaching ships or other noises, and can be utilized with advantage upon small boats from which it may be hung from time to time as occasion may require.

Such an aperiodic microphone mounting as above described may be otherwise supported, but if so supported that the pressures on both sides are equal it will give better results. Moreover, in referring to the part C as a disk I do not mean that it must be circular as it may be square or of any other ordinary shape.

What I claim as my invention is:—

1. The device above described comprising a disk of aperiodic material, a support for said disk, and a microphone mounted on said disk, the support for said disk comprising two recessed members, the edges of which engage said disk whereby the disk serves as a closure for said recesses in said members.

2. The device above described comprising a disk of aperiodic material, a support for said disk, and a microphone mounted on said disk, the support for said disk comprising two recessed members, the edges of which engage said disk whereby the disk serves as a closure for said recesses in said members, said recesses being filled with fluids of different densities.

ROBERT L. WILLIAMS.